UNITED STATES PATENT OFFICE.

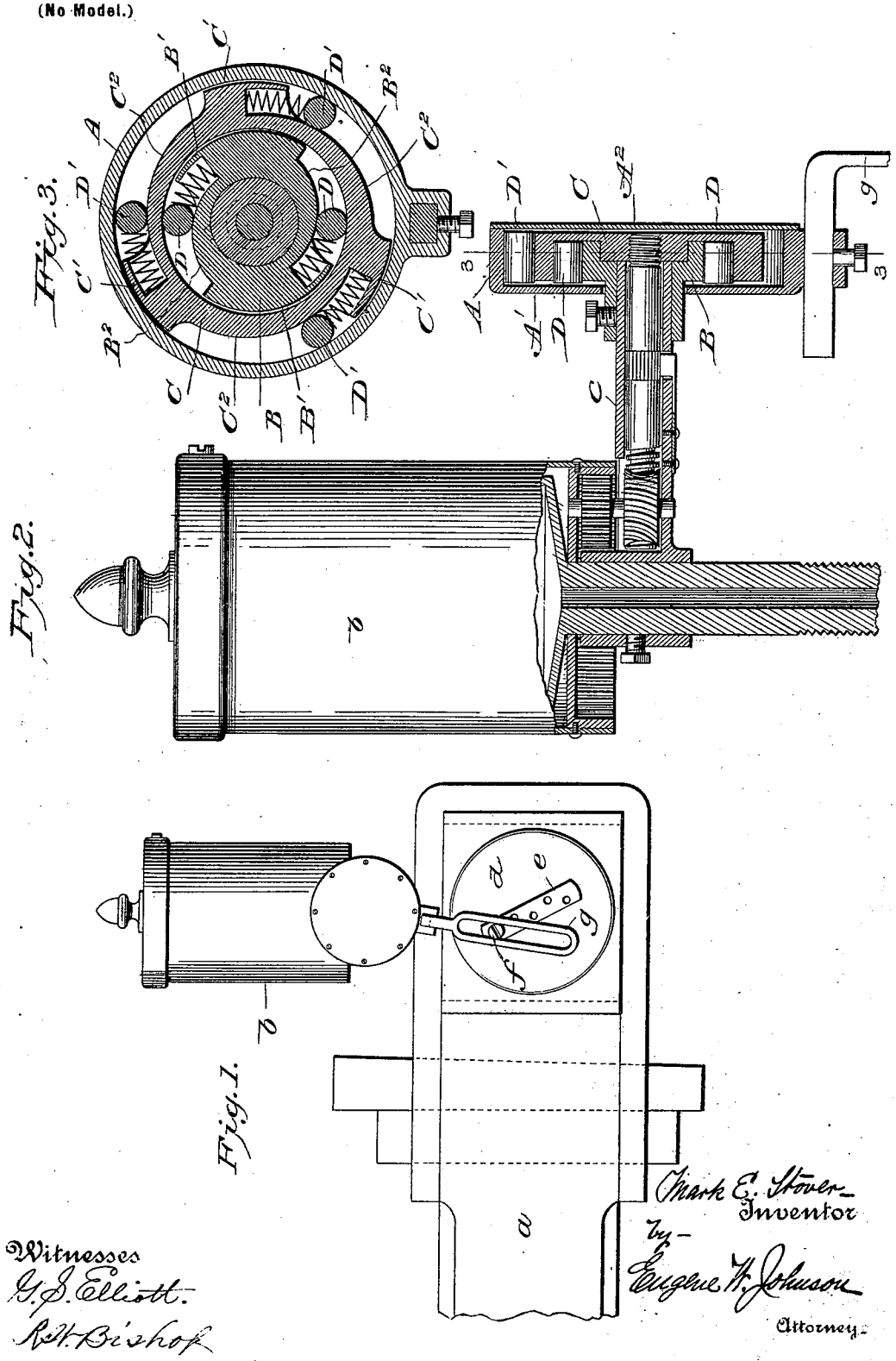

MARK E. STOVER, OF COLUMBUS, OHIO, ASSIGNOR OF ONE-HALF TO JOHN WILLIAM HALL, OF SAGINAW, MICHIGAN.

MECHANISM FOR CONVERTING MOTION.

SPECIFICATION forming part of Letters Patent No. 669,269, dated March 5, 1901.

Application filed November 26, 1900. Serial No. 37,778. (No model.)

*To all whom it may concern:*

Be it known that I, MARK E. STOVER, a citizen of the United States, residing at Columbus, in the county of Franklin and State of Ohio, have invented new and useful Improvements in Mechanism for Converting Motion, of which the following is a specification.

This invention relates to certain new and useful improvements in mechanism for converting an oscillating into a rotary motion; and it consists in the construction and combination of the parts, as will be hereinafter set forth, and specifically pointed out in the claims.

In the accompanying drawings, Figure 1 is a view showing the invention applied to a force-feed lubricator which is carried by a pitman-head to lubricate the wrist-pin, an oscillating motion being imparted to the casing of the clutch by the movement of the pitman. Fig. 2 is an elevation, partly in section; and Fig. 3 is a vertical sectional view on the line 3 3 of Fig 2.

In the drawings, $a$ designates a pitman, upon the head of which is mounted a lubricator $b$, the force-feed mechanism thereof being actuated through the medium of a shaft supported by a casing or sleeve $c$, attached to the stem of the lubricator. The wrist or crank pin $d$ of the pitman $a$ carries a plate $e$, having a plurality of perforations, in one of which is placed a pin $f$ for engagement with an arm $g$, one end thereof being connected to the casing of the clutch, so that it will be oscillated by the movement of the pitman upon the wrist-pin. The means shown for supporting or oscillating the outer case of the clutch may be substantially the same as is shown in my patent for lubricators, No. 574,688, dated January 5, 1897, and though my present invention may be used for such purpose it is not limited thereto, but may be utilized wherever it is desired to convert an oscillating motion into a rotary motion.

The outer rim of the casing A has a cylindrical interior and carries on one side a plate A', having a central aperture for the passage therethrough of the hub of the male ratchet B, and on the other side of the rim is a removable covering plate or disk A², which may be attached to the rim by screws, as shown. The outer casing A is provided with a projecting portion, to which is attached the element or equivalent means for imparting an oscillating movement to the casing. The male clutch or stationary member B has a hub which is secured to the shaft casing or sleeve $c$, so that the same will be held stationary upon its support, and a portion of the face of the male clutch is cut away or recessed to receive the hub or central projecting portion of the female clutch. The periphery of said clutch B is shaped to present on opposite sides segments B' and between the segments inclined surfaces B², the deeper ends whereof may be recessed for the reception of springs used to project rollers away from the deeper ends of the peripheral recesses.

The female clutch or revoluble member C is centrally made fast to the shaft, and from the hub thereof extends a web, the outer portion of which carries a rim which overlies the periphery of the male clutch or stationary member B, said rim having a cylindrical inner surface and an outer face, which presents several segments C', between which are inclined faces C², which taper in a direction opposite to the inclination of the inclined faces of the male clutch B.

Rollers D' D' are placed between the rim of the casing A and the inclined portions of the female clutch C. The rollers D occupy a position between the cylindrical inner face of the female clutch and the inclined faces of the male clutch.

It will be noted that the male clutch B is held stationary and that the female clutch rotates, the operation being that when the casing is oscillated the rollers D' between the rim of the casing and the cam-faces of the revoluble member C drive the shaft forward and that when such rollers are thrown out of locked engagement by a change of direction of movement of the casing the other or inner set of rollers D locks the two clutches to each other, the locking of the clutches preventing any back motion being imparted to the shaft.

I claim—

1. In combination with an oscillating casing, a fixed male clutch with cam-faces, a female clutch positioned between the fixed clutch and the casing the female clutch having outer cam-faces; together with movable locking means between the male and female clutches and between the female clutch and the casing, substantially as shown and for the purpose set forth.

2. In a mechanism for converting oscillating into a rotary motion, the combination with a stationary member having inclined faces and rollers for engagement therewith, of a revoluble member with a cylindrical interior and faces in its periphery which are inclined in a direction opposite to the inclined faces of the stationary member, a casing having a cylindrical interior, and rollers between the casing and revoluble member, substantially as shown.

In testimony whereof I have hereunto set my hand in presence of two subscribing witnesses.

MARK E. STOVER.

Witnesses:
  PEARLE BROWNLEE,
  C. T. WARNER.